United States Patent
Ait Aoudia et al.

(10) Patent No.: US 10,893,495 B2
(45) Date of Patent: Jan. 12, 2021

(54) METHOD AND APPARATUS FOR PROVIDING TIMING SYNCHRONIZATION

(71) Applicant: Nokia Technologies Oy, Espoo (FI)

(72) Inventors: Faycal Ait Aoudia, Saint-Cloud (FR); Jakob Hoydis, Paris (FR)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/778,116

(22) Filed: Jan. 31, 2020

(65) Prior Publication Data
US 2020/0252892 A1    Aug. 6, 2020

(30) Foreign Application Priority Data

Feb. 6, 2019  (FI) ..................................... 20195085

(51) Int. Cl.
| | |
|---|---|
| *H04W 56/00* | (2009.01) |
| *G06N 3/04* | (2006.01) |
| *G06N 3/08* | (2006.01) |
| *H04W 72/04* | (2009.01) |

(52) U.S. Cl.
CPC ........ *H04W 56/001* (2013.01); *G06N 3/0472* (2013.01); *G06N 3/08* (2013.01); *H04W 72/0446* (2013.01)

(58) Field of Classification Search
None
See application file for complete search history.

(56) References Cited

U.S. PATENT DOCUMENTS

| | | | |
|---|---|---|---|
| 5,432,778 A |  | 7/1995 | Minde et al. ................ 370/95.3 |
| 9,882,759 B2 | * | 1/2018 | Lo ........................ H04L 27/2656 |
| 2017/0076200 A1 | * | 3/2017 | Nasu .................... G06N 3/0472 |

OTHER PUBLICATIONS

Dorner et al., "Deep learning based Communication Over the Air", Feb 2018, IEEE, all pages. (Year: 2018).*
Jian Liang et al., "Fast Selecting Optimal Sync Word Based on Filtering and Backtracking for Burst Synchronization", Jan. 2006 (Year: 2006).*
J. Liang et al.; "Fast Selecting Optimal Sync Word Based on Filtering and Backtracking for Burst Synchronization"; IEEE 8th International Conference on Signal Processing, ICSP2006 Proceedings; Jan. 1, 2006; 4 pages.

(Continued)

*Primary Examiner* — Gregory B Sefcheck
*Assistant Examiner* — Srinivasa R Reddivalam
(74) *Attorney, Agent, or Firm* — Harrington & Smith

(57) ABSTRACT

A method, apparatus, receiver and system provide timing synchronization during data transmission over a channel. In the context of a method, the method receives, for individual ones of a plurality of sequences of samples generated by a channel in response to transmission of corresponding frames that are comprised of a plurality of symbols including a preamble and one or more data symbols: (i) a probability vector and (ii) an indication of the sample of the respective sequence that corresponds to the particular symbol of the corresponding frame. The method determines one or more updated parameters of a frame detector of a receiver that receives the sequence of samples from the channel. The method determines one or more updated parameters of a preamble generator of a transmitter that provides the preamble for transmission over the channel.

22 Claims, 8 Drawing Sheets

(56) References Cited

OTHER PUBLICATIONS

C. De Vrieze et al.; "Cooperative Multi-Agent Reinforcement Learning for Low-Level Wireless Communication"; arXiv.org, Cornell University Library, arXiv:1801.04541v1; Jan. 14, 2018; 15 pages.
C. Enz et al.; "WiseNET: An Ultralow-Power Wireless Sensor Network Solution"; Computer, vol. 37, No. 8; Aug. 1, 2004; IEEE Computer Society; 9 pages.
Ait Aoudia, Faycal, et al., "End-to-End Learning of Communications Systems Without a Channel Model", © 2018 IEEE, 6 pgs.
Dorner, Sebastian, et al., "Deep Learning Based Communication Over the Air", © 2017 IEEE, 12 pgs.
Felix, Alexander, et al., "OFDM-Autoencoder for End-to-End Learning of Communications Systems", Cornell University, Mar. 15, 2018, 5 pgs.
Orozco-Galvan, L., et al., "A Resource Efficient Symbol Synchronizer Implementation for the IEEE 802.11 Protocol", © 2018 IEEE, 4 pgs.

\* cited by examiner

METHOD AND APPARATUS FOR PROVIDING TIMING SYNCHRONIZATION

TECHNOLOGICAL FIELD

An example embodiment relates generally to techniques for providing timing synchronization and, more particularly, to techniques for concurrently training both a transmitter and a receiver so as to provide for timing synchronization.

BACKGROUND

Data of various types is commonly transmitted by a transmitter through a communications channel to a receiver. In some instances, the data that is transmitted is comprised of a plurality of frames, each of which includes a plurality of symbols. In order to properly interpret, e.g., decode, the data that is received by the receiver, the receiver must identify the sample from the sequence that corresponds to the first symbol of the corresponding frame, thereby providing for symbol timing synchronization. However, the receiver typically does not know the timing with which the first symbol will be received and, instead, must endeavor to identify the first symbol from the data that is received.

A frame that is transmitted oftentimes include a preamble that is prepended to the data symbols. Some techniques for timing synchronization have relied upon a standardized form of a preamble to facilitate the identification of the preamble by the receiver. For example, the preambles have been designed to have certain mathematical properties, such as auto-correlation properties or cross-correlation properties. Nonetheless, timing synchronization remains an issue for effective data communication and accuracy in decoding the received data.

S. Dörner et al., "Deep learning based communication over the air", *J. Sel. Topics Signal Process.*, Vol. 12, No. 1, pp. 132-143, 2018 discloses a communications system solely composed of neural networks using unsynchronized off-the-shelf software-defined radios and open-source deep learning software libraries. The presented solution extends existing ideas toward continuous data transmission, which eases their current restriction to short block lengths but also entails the issue of receiver synchronization. Specifically, the problem of receiver synchronization is overcome by introducing a frame synchronization module based on a neural network.

BRIEF SUMMARY

A method, apparatus, receiver and system are disclosed for providing timing synchronization during data transmission over a channel, such as a stochastic channel. In this regard, the method, apparatus and system are configured to concurrently train the end-to-end system including both the transmitter and the receiver so as to provide for improved symbol timing synchronization. By providing for improved symbol timing synchronization, data may be transmitted via the channel more effectively with the data being interpreted, such as decoded, in a more accurate manner.

According to an aspect, there is provided the subject matter of the independent claims. Embodiments are defined in the dependent claims. The scope of protection sought for various embodiments of the invention is set out by the independent claims.

BRIEF DESCRIPTION OF THE DRAWINGS

Figure 1:
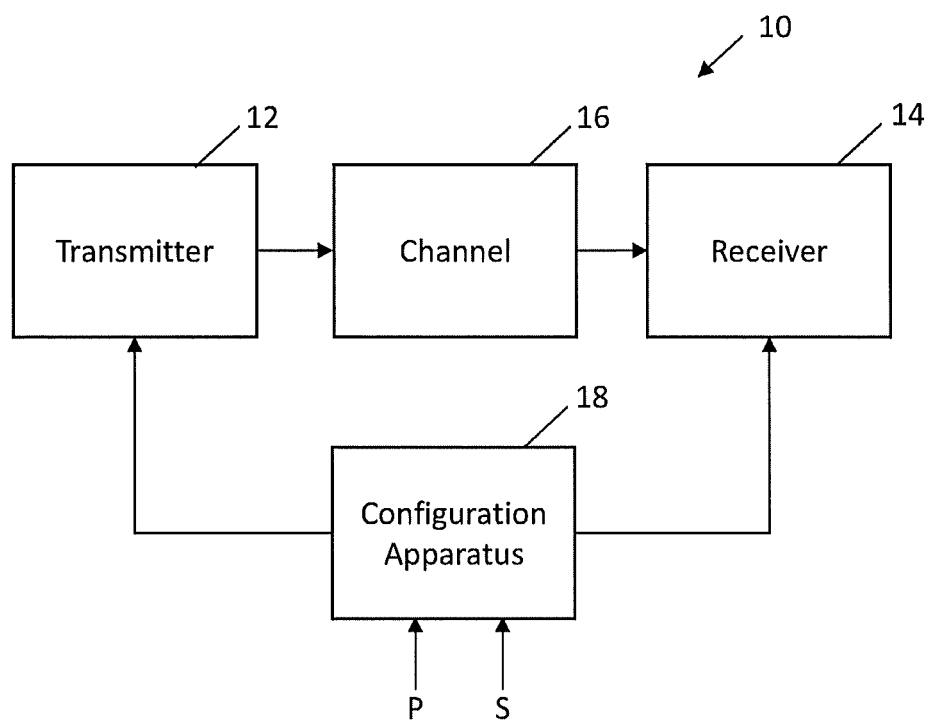
Figure 3:
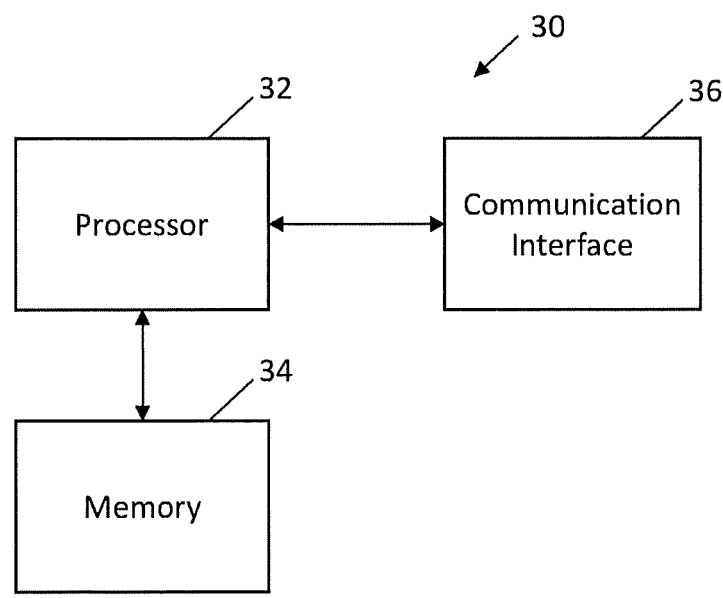
Figure 2:
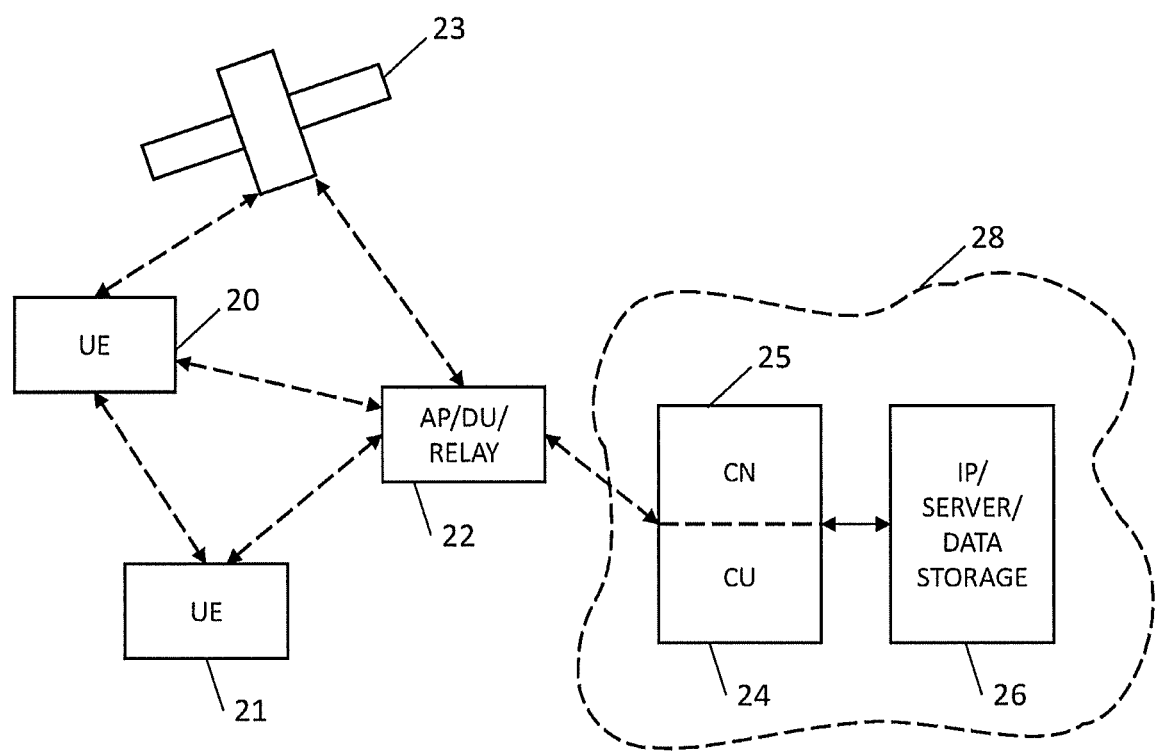
Figure 4:
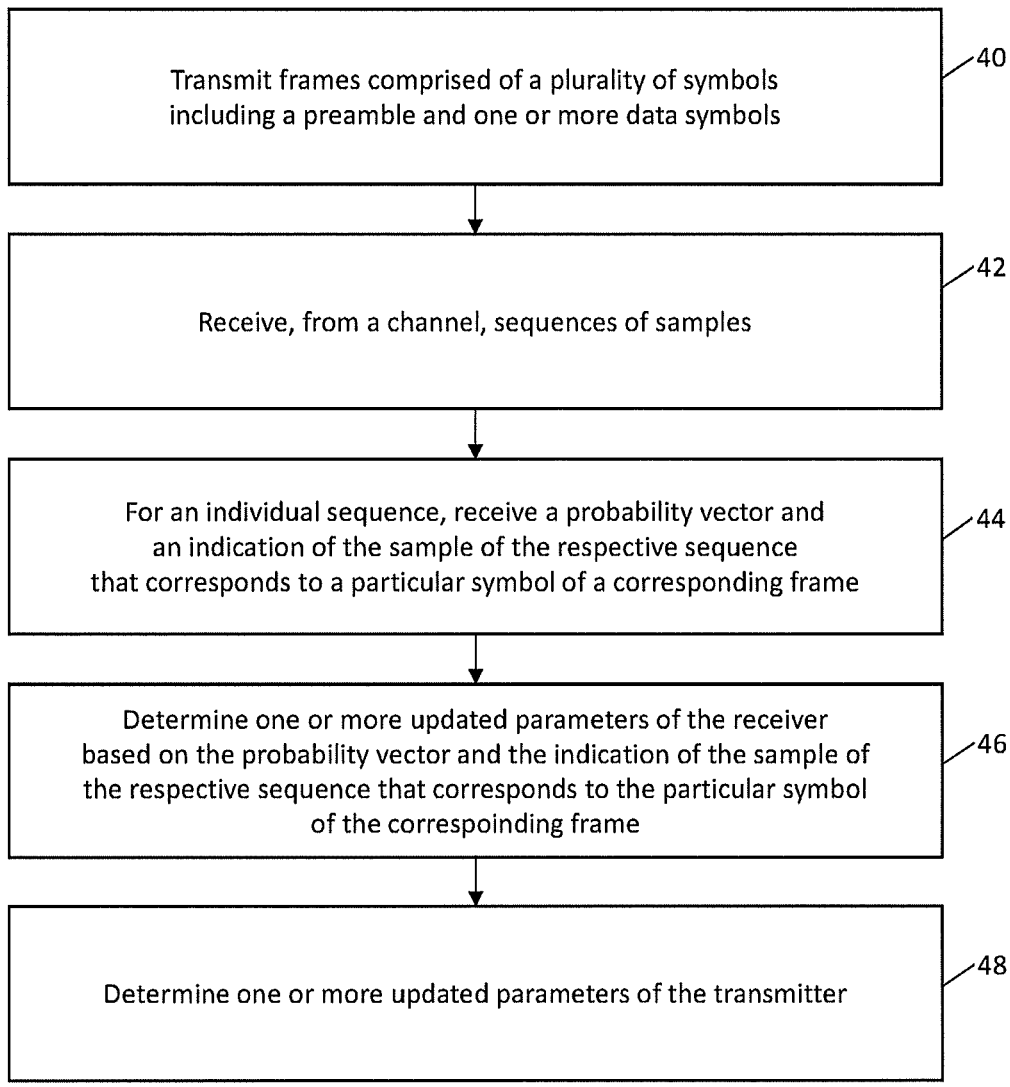
Figure 5:
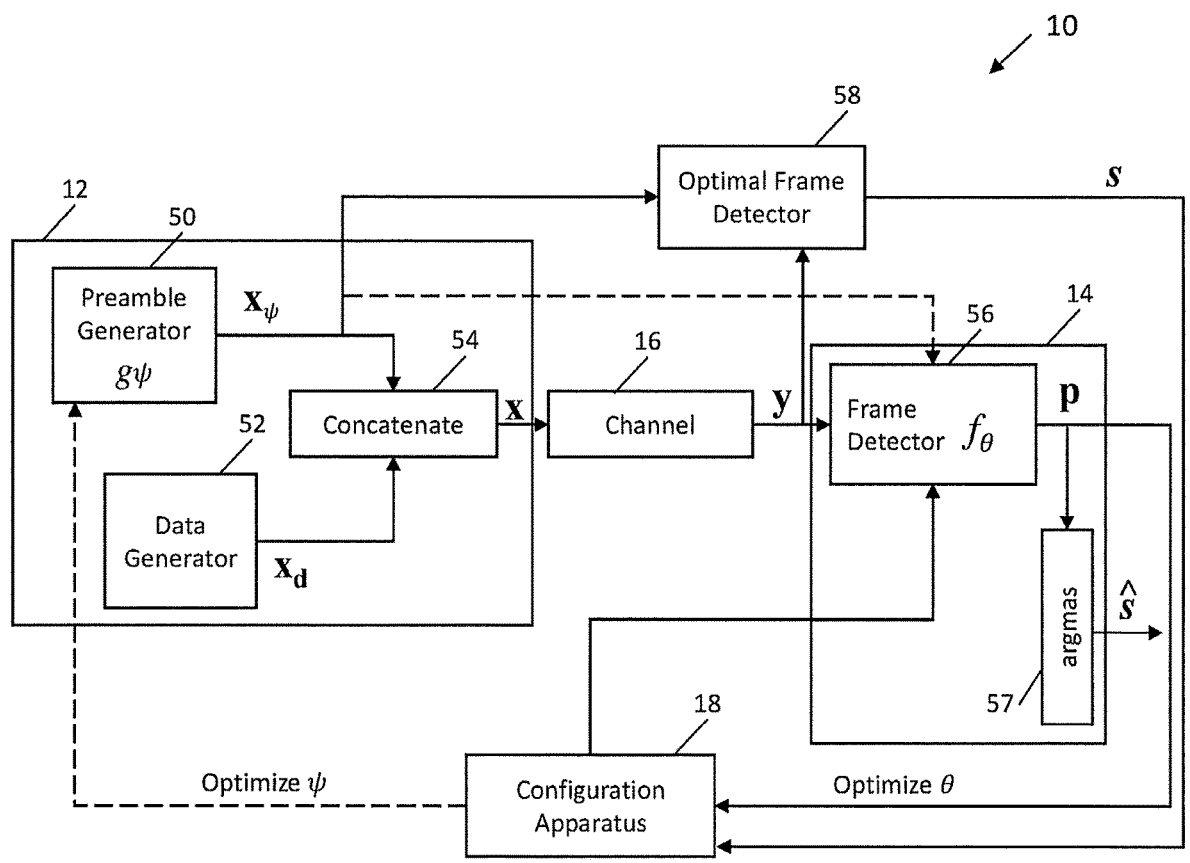
Figure 6:
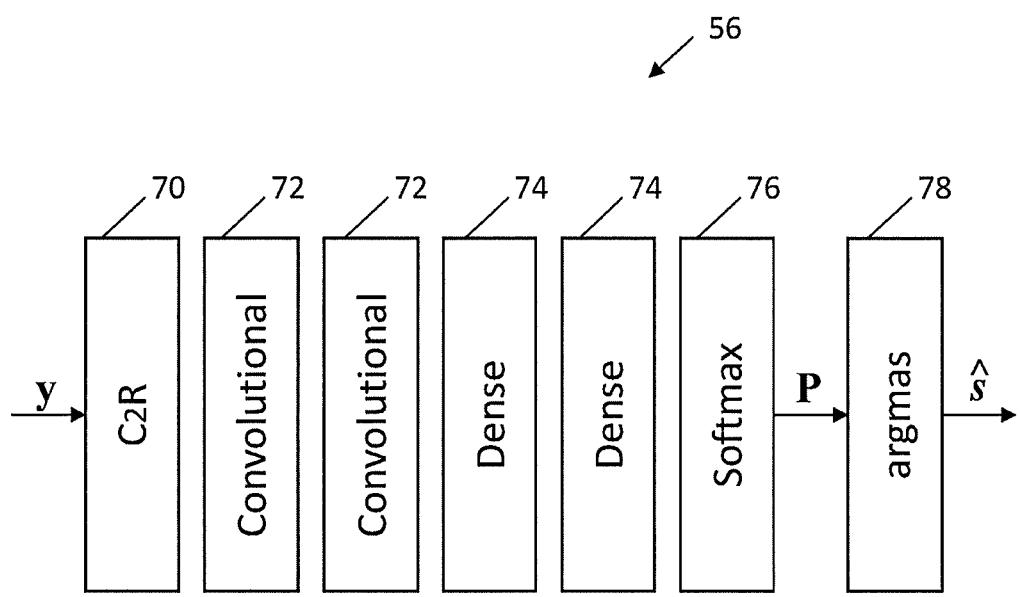
Figure 7:
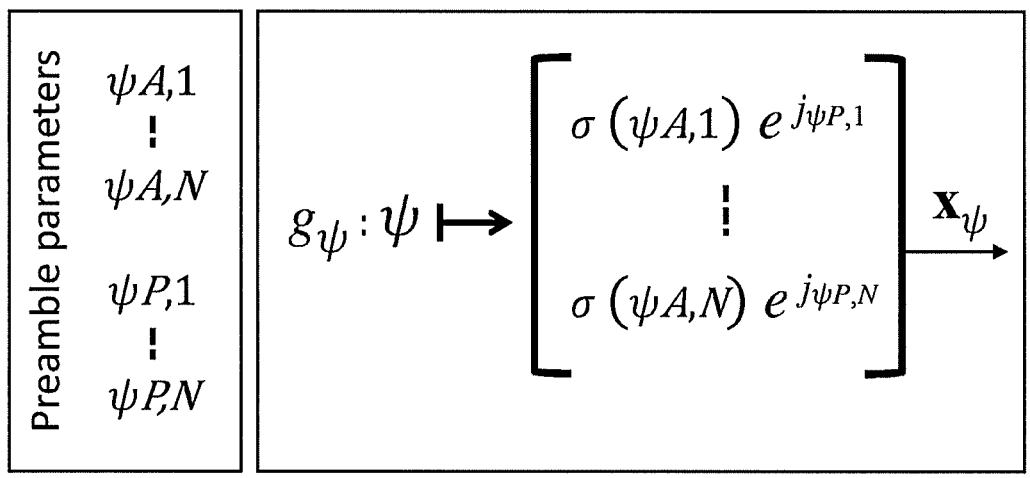
Figure 8:
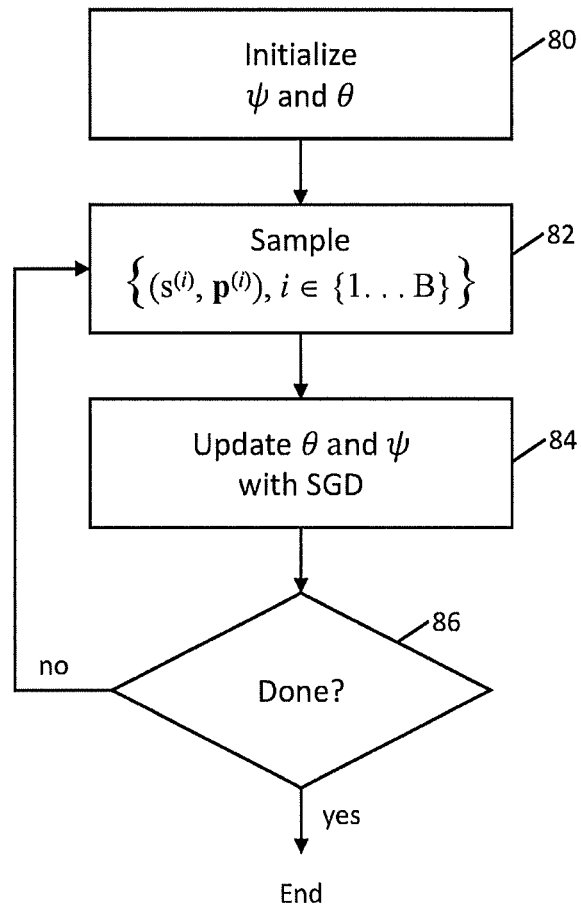
Figure 9:
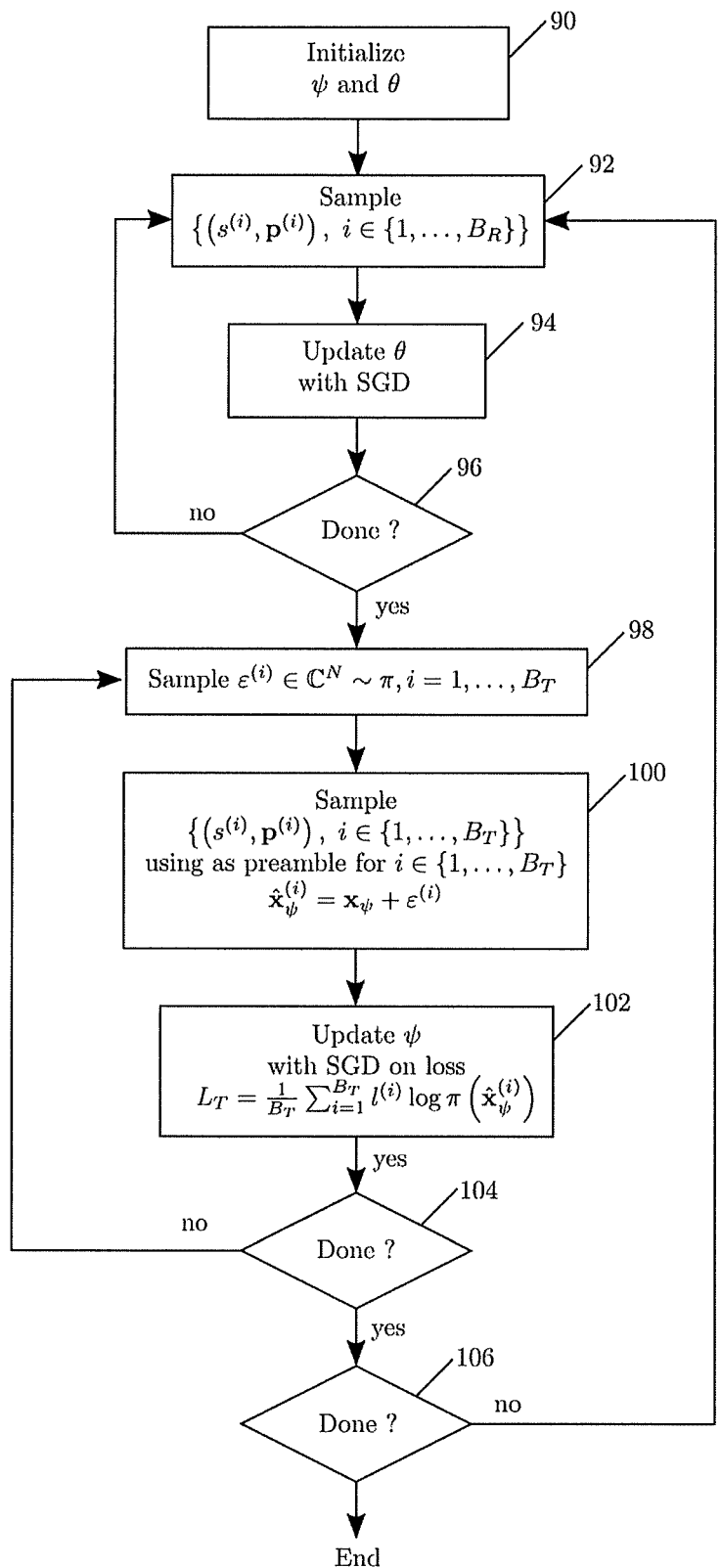

Having thus described certain example embodiments of the present disclosure in general terms, reference will hereinafter be made to the accompanying drawings, which are not necessarily drawn to scale, and wherein:

FIG. 1 is a block diagram of a system including both a transmitter and a receiver configured to communicate via a channel with a configuration apparatus configured to reconfigure the transmitter and the receiver so as to provide for symbol timing synchronization in accordance with an example embodiment;

FIG. 2 is a block diagram of an example communication system in which the system of FIG. 1 may be deployed;

FIG. 3 is a block diagram of an apparatus that may be specifically configured in accordance with an example embodiment of the present disclosure;

FIG. 4 is a flow chart illustrating the operations performed, such as by the apparatus of FIG. 3, in order to determine updated parameters of a transmitter and a receiver in accordance with an example embodiment;

FIG. 5 is a more detailed block diagram of a system of the type depicted in FIG. 1 in accordance with an example embodiment of the present disclosure;

FIG. 6 is a block diagram of a frame detector of a receiver in accordance with an example embodiment of the present disclosure;

FIG. 7 is a representation of a preamble generator of a transmitter in accordance with an example embodiment of the present disclosure;

FIG. 8 is a flow chart illustrating the operations performed, such as by the apparatus of FIG. 3, in order to concurrently determine the updated parameters for both the transmitter and receiver in accordance with an example embodiment of the present disclosure; and FIG. 9 is a block diagram illustrating the operations performed, such as by the apparatus of FIG. 3, in order to sequentially update the parameters of the receiver and then to update the parameters of the transmitter in accordance with an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As a another example, the term 'circuitry' as used herein also includes, for example, a baseband integrated circuit or applications processor integrated circuit for a mobile phone or a similar integrated circuit in a server, a cellular network device, other network device (such as a core network apparatus), field programmable gate array, and/or other computing device.

As illustrated in FIG. 1, a system 10 is provided in accordance with an example embodiment that includes both a transmitter 12 and a receiver 14 configured to communicate via a communications channel 16. As described below, the system also includes a configuration apparatus 18 that is configured to determine updated parameters of both the transmitter and the receiver and to correspondingly reconfigure the transmitter and the receiver utilizing the updated parameters so as to enhance symbol timing synchronization therebetween.

The data that is transmitted via the channel 16 between the transmitter 12 and the receiver 14 can be any of a wide variety of data including, but not limited to digital imagery data including video data, audio data as well as data provided by sensors, radars, telescopes and radio receivers. In at least some instances, the transmitter encodes the data prior to communication of the data via the channel and the receiver correspondingly decodes that data. The resulting data received by the receiver may be utilized for a variety of purposes including presentation to a user, storage of the data and/or provision of the data to one or more applications, such as applications that perform statistical inference on the data for various purposes including object recognition, image classification, spectrum sensing, speech transcription and/or prediction or detection of events. Although depicted in FIG. 1 in the form of unidirectional transmission from the transmitter to the receiver, the transmitter and the receiver may be embodied by a device, such as a transceiver or the like, that includes both a transmitter and a receiver, thereby supporting bidirectional communication.

The system 10 of FIG. 1 may be utilized for a variety of applications. As shown in FIG. 2, for example, a communications system may include a plurality of transmitters and a plurality of receivers configured to communicate via respective channels. In this regard, the user equipment may include a transmitter configured to communicate with a receiver of a base station. Conversely, the base station not only includes a receiver, but also includes a transmitter for communicating with a receiver of the user equipment.

By way of example, the system 10 may be deployed within a radio access architecture based on long term evolution advanced (LTE Advanced, LTE-A) or new radio (NR, 5G). However, the system may be deployed in other application including within other communication networks including, for example, a universal mobile telecommunications system (UMTS) radio access network (UTRAN or E-UTRAN), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

In this regard, FIG. 2 depicts an example of a simplified system architecture only showing some elements and functional entities, all being logical units, whose implementation may differ from what is shown. The connections shown in FIG. 2 are logical connections; the actual physical connections may be different. It is apparent to a person skilled in the art that the system typically comprises also other functions and structures than those shown in FIG. 2.

In the radio access architecture of FIG. 1, user devices 20 and 21 are configured to be in a wireless connection on one or more communication channels in a cell with an access node (such as a NodeB) 22 providing the cell. The physical link from a user device to a NodeB is called the uplink or reverse link and the physical link from the NodeB to the user device is called the downlink or forward link. It should be appreciated that the NodeBs or their functionalities may be implemented by using any node, host, server or access point (AP), etc. entity suitable for such a usage.

A communications system typically comprises more than one NodeB in which case the NodeBs may also be configured to communicate with one another over links, wired or wireless, designed for the purpose. These links may be used for signalling purposes. The NodeB is a computing device configured to control the radio resources of the communication system to which the NodeB is coupled. The NodeB may also be referred to as a base station, an access point or any other type of interfacing device including a relay station capable of operating in a wireless environment. The NodeB includes or is coupled to transceivers. From the transceivers of the NodeB, a connection is provided to an antenna unit that establishes bi-directional radio links to user devices. As such, the transceivers of the NodeB and the transceivers of the user devices may include transmitters 12 and receivers 14 configured to communicate via a channel 16 with the trainable parameters of the transmitters and receivers able to be reconfigured in accordance with an example embodiment. The antenna unit may comprise a plurality of antennas or antenna elements. The NodeB is further connected to core network 25 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Although the apparatuses have been depicted as single entities, different units, processors and/or memory units (not all shown in FIG. 1) may be implemented. Further, the number of reception and/or transmission antennas of the user devices may naturally vary according to a current implementation.

5G enables using multiple input-multiple output (MIMO) antennas, many more base stations or nodes than LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications, including vehicular safety, different sensors and real-time control. 5G is expected to have multiple radio interfaces, namely below 6 GHz, cmWave and mmWave, and also being integratable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require bringing the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), and critical communications (autonomous vehicles, traffic safety, real-time analytics, time-critical control, and healthcare applications).

The communication system is also able to communicate with other networks, such as a public switched telephone network or the Internet 26, or utilize services provided by them. The communication network may also be able to support the usage of cloud services, for example at least part of core network operations may be carried out as a cloud service (this is depicted in FIG. 2 by "cloud" 28). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 22) and non-real time functions being carried out in a centralized manner (in a centralized unit, CU 24).

It should also be understood that the distribution of labor between core network operations and base station operations may differ from that of the LTE or even be non-existent. Some other technology advancements that may be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 23 in the mega-constellation may cover several satellite-enabled network entities that create on-ground cells. The on-ground cells may be created through an on-ground relay node 22 or by a gNB located on-ground or in a satellite.

The depicted system is only an example of a part of a radio access system in which the system 10 of FIG. 2 may be deployed and in practice, the system may comprise a plurality of NodeBs, the user devices may have an access to a plurality of radio cells and the system may comprise also other apparatuses, such as physical layer relay nodes or other network elements, etc. At least one of the NodeBs or may be a Home nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The NodeBs of FIG. 2 may provide any kind of these cells. A cellular radio system may be implemented as a multilayer network including several kinds of cells. Typically, in multilayer networks, one access node provides one kind of a cell or cells, and thus a plurality of NodeBs are required to provide such a network structure.

For fulfilling the need for improving the deployment and performance of communication systems, the concept of "plug-and-play" NodeBs has been introduced. Typically, a network which is able to use "plug-and-play" Node Bs, includes, in addition to Home NodeBs (HnodeBs), a home node B gateway, or HNB-GW (not shown in FIG. 2). A HNB Gateway (HNB-GW), which is typically installed within an operator's network may aggregate traffic from a large number of HNBs back to a core network. Although FIG. 2 depicts one example communication system in which system 10 of an example embodiment may be deployed, the system of other example embodiments may be deployed in other types of systems, be they to support communications or otherwise.

The channel 16 may be any of a variety of different types including, for example, a wireless channel, an optical channel or the like and, in some embodiments, may be configured to support multiple orthogonal channels, such as in time, frequency or space, that are utilized in parallel. Regardless of the type of channel, the channel over which the transmitter 12 and the receiver 14 communicate may be a stochastic channel. As such, the channel receives frames transmitted by the transmitter that are comprised of a plurality of symbols. These symbols include a preamble and one or more data symbols. The preamble is typically prepended to the data symbols. In response, the channel generates a plurality of sequences of samples that are received by the receiver. However, the timing with which the samples of a sequence are received is generally unknown, at least to the receiver. As such, the receiver is configured to identify the sample of a sequence that corresponds to a particular symbol of the corresponding frame, such as the preamble or the first data symbol of the corresponding frame, in order to allow for proper interpretation, e.g., decoding, of the received data.

As also shown in FIG. 1, the system 10 of an example embodiment additionally includes a configuration apparatus 18. The configuration apparatus is configured to determine updated parameters (for the trainable parameters of the transmitter 12 and the receiver 14) based on frames of symbols transmitted via the channel 16 and sequences of samples generated by the channel and received by the receiver. The transmitter and the receiver may then be reconfigured based upon the updated parameters.

Although depicted to be separate from the transmitter 12 and the receiver 14 in FIG. 1, the configuration apparatus 18 or a portion thereof may be implemented by one or both of the transmitter and the receiver. For example, the functionality described below in relation to the configuration apparatus may be distributed between the transmitter and the receiver and, some embodiments, an additional configuration apparatus. Alternatively, the configuration apparatus may be implemented entirely by the transmitter, or implemented entirely by the receiver. For purposes of illustration, but not of limitation, however, this system 10 of FIG. 1 will be described below in conjunction with a configuration apparatus that is communication with both S the transmitter and receiver.

One example of an apparatus 30 that may be configured to function as the configuration apparatus 18 is depicted in FIG. 3. As shown in FIG. 3, the apparatus includes, is associated with or is in communication with processing circuitry 32, a memory 34 and a communication interface 36. The processing circuitry may be in communication with the memory device via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processing circuitry). The memory device may be configured to store information, data, content, applications, instructions, or the like for enabling the apparatus to carry out various functions in accordance with an example embodiment of the present disclosure. For example, the memory device could be configured to buffer input data for processing by the processing circuitry. Additionally or alternatively, the memory device could be configured to store instructions for execution by the processing circuitry.

The apparatus 30 may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processing circuitry 32 may be embodied in a number of different ways. For example, the processing circuitry may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated a circuit), an FPGA (field programmable gate array), a microcontroller unit (MCU), a hardware accelerator, a special-purpose computer chip, or the like. As such, in some embodiments, the processing circuitry may include one or more processing cores configured to perform independently. A multi-core processing circuitry may enable multiprocessing within a single physical package. Additionally or alternatively, the processing circuitry may include one or more processors configured in tandem via the bus to enable independent execution of instructions, pipelining and/or multithreading.

In an example embodiment, the processing circuitry 32 may be configured to execute instructions stored in the memory device 34 or otherwise accessible to the processing circuitry. Alternatively or additionally, the processing circuitry may be configured to execute hard coded functionality. As such, whether configured by hardware or software methods, or by a combination thereof, the processing circuitry may represent an entity (e.g., physically embodied in circuitry) capable of performing operations according to an embodiment of the present disclosure while configured accordingly. Thus, for example, when the processing circuitry is embodied as an ASIC, FPGA or the like, the processing circuitry may be specifically configured hardware for conducting the operations described herein. Alternatively, as another example, when the processing circuitry is embodied as an executor of instructions, the instructions may specifically configure the processor to perform the algorithms and/or operations described herein when the instructions are executed. However, in some cases, the processing circuitry may be a processor of a specific device (e.g., an image or video processing system) configured to employ an embodiment of the present invention by further configuration of the processing circuitry by instructions for performing the algorithms and/or operations described herein. The processing circuitry may include, among other things, a clock, an arithmetic logic unit (ALU) and logic gates configured to support operation of the processing circuitry.

The communication interface 36 may be any means such as a device or circuitry embodied in either hardware or a combination of hardware and software that is configured to receive and/or transmit data, including media content in the form of video or image files, one or more audio tracks or the like. In this regard, the communication interface may include, for example, an antenna (or multiple antennas) and supporting hardware and/or software for enabling communications with a wireless communication network. Additionally or alternatively, on the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

Referring now to FIG. 4, the operations performed in order to determine the updated parameters of both the transmitter 12 and receiver 14 and, as a result, to reconfigure the end-to-end system 10 are depicted. As shown in block 40 of FIG. 4, the transmitter is configured to transmit a plurality of frames, each comprised of a plurality of symbols. Of the symbols that comprise a respective frame, the frame includes a preamble and one or more data symbols to which the preamble may be prepended. Following propagation via the channel 16, the channel generates and the receiver 14 is configured to receive a plurality of sequences of samples. See block 42 of FIG. 4.

Following receipt of the sequence, a probability vector p is generated, such as by the receiver 14, that assigns probabilities to the samples of a respective sequence with each probability pi being associated with a respective sample i and identifying the probability that the respective sample i corresponds to a particular symbol of the frame, such as the preamble, the first data symbol or the like. In an example embodiment, the probability vector p has a number of elements equal to the number of samples of a respective sequence. The elements of the probability vector may be ordered in the same manner as that in which the samples of the respective sequence were received. A probability vector p may be separately generated for each sequence received by the receiver.

As shown in block 44 of FIG. 4, the configuration apparatus 18 includes means, such as the processing circuitry 32, the communication interface 36 or the like, for receiving the probability vector for a respective sequence, such as from the receiver 14. The apparatus of this example embodiment also includes means, such as the processing circuitry, the communication interface or the like, for receiving an indication s of the sample of the respective sequence that actually corresponds to the particular symbol of the corresponding frame.

By way of further example, FIG. 5 depicts a more detailed flow chart of one embodiment of the system 10 of FIG. 1. As shown in FIG. 5, the transmitter 12 of an a example embodiment includes a preamble generator 50 configured to generate the preamble $x_\psi$, and a data generator 52 configured to generate the data symbols $x_d$. The preamble is denoted by a vector of trainable parameters $x_\psi = |x_1, \ldots, x_N|^T$ and is a complex valued sequence of size N that is generated by the preamble generator $g_\psi$. As shown by block 54, the transmitter is also configured to concatenate the preamble symbol with the data symbols, such as by prepending the preamble symbol to the data symbols, and to thereafter cause the resulting frame x of total length M>N to be transmitted via the channel 16. The receiver 14 of this example embodiment includes a frame detector 56 configured to evaluate the sequence y of samples generated by the channel and to generate the probability vector p. In this embodiment, the sequence $y \in C^W$ of size W>M samples. As shown in block 57, the receiver is also configured to identify the element ŝ within the probability vector p of size W that is associated with the sample that most likely corresponds to the particular symbol of the corresponding frame, such as the preamble the first data symbol or the like. For example, the receiver of an example embodiment is configured to identify the element ŝ within the probability vector p that is associated with the sample that most likely corresponds to the particular symbol of the corresponding frame by identifying the element ŝ within the probability vector p that has the greatest value, such as by applying of an argmax function to the probability vector p. The receiver may be configured to provide the probability vector p and the element B within the probability vector p that has the greatest value to one or more applications to permit proper analysis, e.g., decoding, and/or utilization of the received data. In this example embodiment, the transmitter or at least the preamble generator and/or the data generator of the transmitter and the receiver or at least the frame detector of the receiver may be embodied by respective computing devices, each including, for example, an apparatus of the type depicted in FIG. 3.

In the example embodiment of FIG. 5, the system 10 may also include an optimal frame detector 58 configured to evaluate the sequence y of samples generated by the channel 16 in view of the preamble $x_\psi$ of the corresponding frame transmitted by the transmitter 12 that caused the channel to generate the sequence of samples. With knowledge of the preamble, the optimal frame detector is configured to identify the sample of the sequence that corresponds to the particular symbol of the corresponding frame such as the preamble, the first data symbol or the like. In this example embodiment, the optimal frame detector may be embodied by a computing device including, for example, an apparatus of the type depicted in FIG. 3.

In order to determine the sample of the sequence that corresponds to the particular symbol of the corresponding frame, the optimal frame detector 58 of this example embodiment may be configured to conduct in an exhaustive, unconstrained search of all of the samples of the sequence relative to all of the symbols of the corresponding frame in order to identify the sample of the sequence that corresponds to the particular symbol of the corresponding frame. Based on this evaluation, the optimal frame detector is configured to generate an indication s of the sample of the respective sequence that corresponds to the particular symbol of the corresponding frame. As such, the configuration apparatus 18, such as the processing circuitry 32, the communication interface 36 or the like, of this example embodiment is configured to also receive the indication s of the sample of the respective sequence that corresponds to the particular symbol of the corresponding frame that is generated and provided by the optimal frame detector. See block 44 of FIG. 4.

As shown in block 46 of FIG. 4, the configuration apparatus 18 of this example embodiment also includes means, such as the processing circuitry 32 or the like, for determining one or more updated parameters of the receiver 14, such as the frame detector 56 of the receiver, that receives the sequence of samples from the channel 16. The updated parameters of the receiver, such as the frame detector, are based on the probability vector p and the indication s of the sample of the respective sequence that corresponds to the particular symbol for the corresponding frame.

The trainable parameters of the receiver 14, such as the trainable parameters of the frame detector 56 of the receiver, are described in one embodiment in relation to FIG. 6. As shown in FIG. 6, the receiver and, more particularly, the frame detector of the receiver may include a plurality of layers. In particular, the frame detector may include a $C^2R$ layer 60 configured to convert the vector of samples of a sequence y received by the receiver into real values, such as by concatenating the real and imaginary parts of the respective sample to obtain a vector having values in $R^{2W}$. The resulting vector is provided to one or more convolutional layers 62. Each convolutional layer may have the same or different kernel sizes, strides and activation functions, e.g., a rectified linear unit (ReLU), a tan h function, a sigmoid function, a linear function or the like. The convolutional layers are configured to exploit the spatial structure of the data that is received. The output of the one or more convolutional layers is provided to one or more dense layers 64. The dense layers may have the same or different CD activation layers. The last of the dense layers provides an output having a dimension of W that is provided to a softmax layer 66 that generates the probability vector p based upon the output of the dense layers. As described above, the probability vector p has elements pi that represent the probability that the corresponding frame begins at the ith sample of this sequence. In this example embodiment, the probability vector p is, in turn, provided to an argmax layer 68 that identifies the element of the probability vector p having the maximum value and designates this maximum value ŝ.

As illustrated in FIG. 6, the receiver 14, such as the frame detector 56 of the receiver, operates on a window of symbols of size W and may be implemented as neural network, which defines the parametric mapping of the receiver, such as the frame detector, as follows:

$$f_\theta: C^W \mapsto \left\{ p \in R_+^W \,\middle|\, \sum_{i=1}^W p_i = 1 \right\} \times \{1, \ldots, W\}$$

As such, the receiver, such as the frame detector, receives of samples $y \in C^W$ such that $f_\theta$ maps a W-dimensional complex-valued vector to a W-dimensional probability vector and an integer from the set $(1, \ldots, W)$ indicates the position of the starting sample of the frame.

The convolutional layer(s) 62 and/or the dense layer(s) 64 may be represented as a neural network having a plurality of trainable parameters θ. As such, the updated parameters of the receiver 14, such as the frame detector 56 of the receiver, that are determined in accordance with an example embodiment may be utilized as described below to modify the trainable parameters of the neural network formed by the one or more of the convolutional and dense layers of the frame detector and, as a result, modify the operation of the receiver, such as the frame detector, including the manner in which the probability vector p is determined.

As shown in block 46 of FIG. 4, the configuration apparatus 18 also includes means, such as the processing circuitry 32 or the like, for determining one or more updated parameters of the transmitter 12, such as the preamble generator 50 of the transmitter, that provides the preamble for transmission over the channel 16. Referring now to FIG. 7, a representation of the trainable parameters of the preamble generator of a transmitter of an example embodiment is depicted. As shown, the preamble parameters include a plurality of parameters configured to control the amplitude A of the preamble symbols and the plurality of parameters configured to control the phase P of the preamble symbols. With reference to FIG. in which the preamble includes N parameters designated 1, 2, ... N, the plurality of parameters configured to control the amplitude A of the preamble symbol are designated $\psi_{A,1}, \ldots \psi_{A,N}$ and the plurality of parameters configured to control the phase P of the preamble symbol are designated $\psi_{P,1}, \ldots \psi_{P,N}$. For each trainable parameter of the preamble, the trainable parameters configured to control the amplitude A and the phase P be combined utilizing, for example, a sigmoid function σ to form a composite trainable parameter such as shown below.

$$\Psi_i = \sigma(\psi_{A,i}) e^{j\psi_{P,i}}$$

In the foregoing example, the sigmoid function a is employed to ensure that the power constrained $|x_i^2| \leq 1$ is satisfied. Like the receiver 14, such as the frame detector 56, the transmitter 12, such as the preamble generator 50, may be implemented as a neural network. Thus, the one or more trainable parameters of the preamble generator may be modified by the updated parameters in order to correspondingly modify the manner in which the preamble symbol is generated by the transmitter, such as the preamble generator. Although FIGS. 6 and 7 depict examples of the architecture of the frame detector 56 of a receiver 14 and a preamble generator of a transmitter, one or both of the frame detector of the receiver or the preamble generator of the transmitter may have different architectures in other embodiments.

As shown in block 48 of FIG. 4, the configuration apparatus 18 of an example embodiment also includes means, such as the processing circuitry 32 or the like, for reconfiguring both the transmitter 12, such as the preamble generator 50 of the transmitter, and the receiver 14, such as the frame detector 56 of the receiver, based upon the updated parameters that have been determined. In this regard, the reconfiguration of the transmitter and the receiver may include the modification of the trainable parameters to have the values defined by the updated parameters that have been determined in accordance with an example embodiment. Based upon the updated parameters, the system 10 may again transmit data again via the channel 16 and the process of determining updated parameters may be repeated any number of times until, for example, the accuracy with which the system transmits and receives data via the channel is of a predefined level, such as with an error of less than a predefined threshold.

A configuration apparatus 18, method and computer program product may be configured to determine the updated parameters of the transmitter 12 and the receiver 14 in various manners. By way of example, but not of limitation, FIGS. 8 and 9 depict two different techniques for determining the updated parameters and each will be described hereinbelow. Referring now to FIG. 8 which depicts training of the end-to-end system 10 in a supervised manner, the operations performed in order to determine the updated parameters in an instance in which a model of the channel 16 is predefined are depicted. Although the model the channel may be predefined in various manners, the channel is modeled in one embodiment so as to be differentiable and to be the same as or a close approximation of the actual communication channel via which the transmitter and receiver will subsequently communicate. As the model of the channel is predefined in this example embodiment, the method and apparatus represented by the flow chart of FIG. 8 may be employed in a simulation environment, such as prior to deployment of the transmitter and receiver.

As shown in block 80 of FIG. 8, the configuration apparatus 18 of this example embodiment includes means, such as the processing circuitry 32 or the like, for initializing the trainable parameters ψ of the transmitter 12, such as the preamble generator 50 of the transmitter, and the trainable parameters θ of the receiver 14, such as the frame detector 56 of the receiver. Once the trainable parameters have been initialized, a plurality of frames of symbols may be transmitted by the transmitter via the channel, such as a simulated channel, that has been modeled. The channel generates sequences of samples received by the receiver. As a result, the end-to-end system 10 is sampled to generate $B_R$ realizations $\{s^{(i)}, p^{(i)}, i \in \{1, \ldots B_R\}\}$. See block 82 of FIG. 8. As described above, for each sequence of samples, the receiver, such as the frame detector, is configured to generate a probability vector p and the optimal frame detector 58 is configured to provide an indication s of the sample of the respective sequence that corresponds to the particular symbol of the corresponding frame.

As shown in block 84 of FIG. 8 and based upon the samples of the end-to-system 10 that generate the $B_R$ realizations, the configuration apparatus 18 includes means, such as the processing circuitry or the like, configured to determine one or more updated parameters of the receiver 14, such as the frame detector 56 of the receiver, and the transmitter 12, such as the preamble generator 50 of the transmitter, with an optimization function, such as stochastic gradient descent (SGD), that uses a loss function, such as cross-entropy (CE) loss function, and is based upon a probability vector p and an indication s of the sample of a respective sequence that corresponds to a particular symbol of the corresponding frame. In this regard, the configuration apparatus, such as the processing circuitry or the like, is configured to apply an optimization function, such as one step of SGD, to the trainable parameters of the transmitter and the receiver in order to minimize the loss function, such as a CE loss function, which may be defined as follows:

$$\mathcal{L}_{(\psi,\theta)} = \mathbb{E}\{\log p_s\}$$

wherein the expectation E is taken over realizations of the frame starting sample s, data frame $x_d$ and channel realizations. Assuming independent and identically distributed (iid) realizations, the loss function may be approximated as follows:

$$L(\psi, \theta) \approx -\frac{1}{B}\sum_{i=1}^{B}\log p_{s^{(i)}}^{(i)}$$

wherein B denotes the batch size, that is, the number of samples used to estimate the loss function. Various types of SGD may be employed including, for example, adaptive moment estimation (ADAM), root mean square propagation (RMSprop) or Momentum algorithms. The batch size B and the type of SGD may be selected as optimization parameters.

The application of the optimization function, such as the SGD, to minimize the loss function determines updated parameters for both the transmitter 12 and the receiver. As a result, the configuration apparatus 18, such as the processing circuitry 32, is configured to determine the one or more updated parameters of the transmitter, such as the preamble generator 50 of the transmitter, based on the probability vector p and the indication s of the sample of the respective sequence that corresponds to the particular symbol of the corresponding frame, that is, based on the same factors that are utilized in the determination of the updated parameters for the receiver, such as the frame detector 56 of receiver.

Following application of an optimization function, such as the SGD, the configuration apparatus 18, such as the processing circuitry 32, of this example embodiment is configured to determine whether the training process is completed, such as by having satisfied a predefined stopping criteria. See block 86 of FIG. 8. The predefined stopping criteria may be defined in various manner including, for example, the completion of a predefined number of iterations of the process depicted in FIG. 8 or the variation in the amount by which the trainable parameters are modified from the prior iteration to the current iteration being less than a predefined amount. If the stopping criterion is satisfied, the configuration apparatus, such as the processing circuitry, is configured to reconfigure the transmitter 12, such as the preamble generator 50 of the transmitter, and the receiver 14, such as the frame detector 56 of the receiver, by modifying the trainable parameters with the updated parameters determined in accordance with the supervised learning technique of FIG. 8.

As the foregoing example illustrates, the configuration apparatus 18 of this example embodiment includes means, such as the processing circuitry 32, the communication interface 36 or the like, for repeatedly receiving the probability vector p and the indication s of the sample of the respective sequence that corresponds to the particular symbol of the corresponding frame and determining one or more updated parameters of the receiver 14, such as the frame generator 56 of the receiver, and of the transmitter 12, such as the preamble generator 50 of the transmitter. Thus, both the receiver, such as the frame detector of the receiver, and the transmitter, such as the preamble generator of the transmitter, may be concurrently trained.

Unlike the embodiment of FIG. 8 which relies upon a differentiable channel model and, as a result, employs a supervised learning technique to evaluate the end-to-end system 10, such as the transmitter 12 including the preamble generator 50, the channel model and the receiver 14 including the frame detector 56 as a single neural network, FIG. 9 depicts a different technique for determine the updated parameters that does not require any knowledge of the channel and does not require the channel to differentiable. Thus, the process of FIG. 9 may be performed in a reinforcement learning (RL) manner. In this regard, RL consists of exploring the neighborhood of the current parameters of the transmitter, such as the preamble generator, by adding a small perturbation to the parameters of the transmitter, such as the preamble generator. Such exploration enables approximation of the loss gradient which, in turn, is utilized to update the parameters of the transmitter, such as the preamble generator. The technique of determining W the updated parameters depicted in FIG. 9 and described below can be utilized to determine the updated parameters of a transmitter and a receiver in operation over an actual channel 16, thereby eliminating the restrictions upon the channel. training of the parameters of the transmitter, such as the preamble generator.

The embodiment depicted in FIG. 9 for determining the updated parameters consists of two phases with the first phase configured to determine the updated parameters for the receiver 14, such as frame detector 56, and the second phase configured to determine updated parameters for the transmitter 12, such as the preamble generator 50. Each phase and, in turn, the overall process may be performed repeatedly and iteratively until a desired performance level is achieved. Turning now to block 90 of FIG. 9, the configuration apparatus 18, such as the processing circuitry 32 or the like, is configured to initialize the trainable parameters $\psi$ of the transmitter, such as the preamble generator, and the trainable parameters $\theta$ of the receiver, such as the frame detector, such as by randomly initializing the trainable parameters. The configuration apparatus, such as the processing circuitry or the like, is then configured to sample the end-to-end system 10 to generate $B_R$ realizations with a probability vector p and an indication of the sample of the respective sequence that corresponds to the particular symbol of the corresponding frame being provided for each realization i. See block 92. The configuration apparatus of this example embodiment includes means, such as the processing circuitry or the like, is then configured to determine one or more updated parameters of the receiver, such as the frame detector, by applying an optimization function, such as SGD and, more particularly, one step of SGD, to the trainable parameters of the receiver, such as the frame detector, using a loss function, such as a CE loss function or the approximation of the CE loss function defined above, based upon the probability vector p and the indication s of the sample of the respective sequence that corresponds to the particular symbol of the corresponding frame. See block 94.

Following determination of the updated parameters of the receiver 14, such as the frame detector 56, the configuration apparatus 18, such as the processing circuitry 32, of this example embodiment is configured to determine whether the training process for the receiver is completed, such as by having satisfied a predefined stopping criteria. See block 96 of FIG. 9. The predefined stopping criteria may be defined in various manners including, for example, the completion of a predefined number of iterations of the first phase of the process depicted in FIG. 9 or the variation in the amount by which the trainable parameters are modified from the prior iteration to the current iteration of the first phase being less than a predefined amount.

If the predefined stopping criteria is not satisfied, the first phase of the training process is repeated. Thus, the configuration apparatus 18 of this example embodiment includes means, such as the processing circuitry 32, the communication interface 36 or the like, for repeatedly receiving the probability vector p and the indication s of the sample of the respective sequence that corresponds to the particular symbol of the corresponding frame and means, such as the processing circuitry or the like, for determining one or more updated parameters of the receiver 14, such as a the frame detector 56, in order to train the receiver, such as the frame detector.

However, once the predefined stopping criteria for the first phase configured to determine the updated parameters of the receiver 12, such as the frame detector 50, has been satisfied, the configuration apparatus 18, such as the processing circuitry 32 or the like, of this example embodiment then proceeds to the second phase in order to determine the updated parameters of the transmitter 12, such as the preamble generator 50, by sampling a plurality of perturbation vectors $\varepsilon^i$, such as $B_T$ perturbation vectors, independently from and according to a distribution the $\pi(\varepsilon)$. The $B_T$ perturbation vectors $\varepsilon^i$ may be defined as $\varepsilon^i \epsilon C^N$, I=1, ..., $B_T$. See block 98 of FIG. 9. Although various distributions of $\pi(\varepsilon)$ may utilized, one example of the distribution $\pi(\varepsilon)$ is a multivariate complex Gaussian distribution $\mathcal{CN}(0,\sigma^2 I_N)$ having a variance, such as small variance, $\sigma^2$.

The configuration apparatus 18, such as the processing circuitry 32 or the like, of this example embodiment then samples the end-to-end system 10 to generate a plurality of realizations, such as $B_T$ realizations. See block 100 of FIG. 9. A probability vector p and an indication s of the sample of the respective sequence that corresponds to the particular symbol of the corresponding frame is provided for each realization. For sample i of the end-to-end system, the preamble $\hat{x}_\psi^{(i)}$ that is transmitted over the channel 16 is not the preamble generated utilizing the current parameters of the preamble generator 50, but is, instead the $i^{th}$ sample of the perturbed parameter $\varepsilon^i$ and is defined as follows:

$$\hat{x}_\psi^{(i)} = x_\psi + \varepsilon^{(i)}$$

In this regard, the configuration apparatus 18 of this example embodiment includes means, such as the processing circuitry 32, the communication interface 36 or the like, for receiving, for individual ones of a plurality of second sequences of samples generated by the channel 16 in response to transmission of corresponding frames that are each comprised of a plurality of symbols including a perturbed parameter and one of our data symbols, a second probability vector p and an indication s of the sample of the respective second sequence that corresponds to a particular symbol of the corresponding frame. The second probability vector assigns probabilities to the samples of the respective second sequence that identify the probability that a respective sample corresponds to a particular symbol of the corresponding frame. The configuration apparatus 18 of this example embodiment includes means, such as the processing circuitry 32 or the like, for determining one or more updated parameters of the transmitter, such as the preamble generator, by applying an optimization function, such as SGD and, more particularly, one step of SGD, to the trainable parameters of the transmitter 12, such as the preamble generator 50, using a loss function $L_T$ that is based upon the second probability vector and the indication of the sample of the respective sequence that corresponds to the particular symbol of the corresponding frame. See block 102. In one embodiment, the loss function is defined as:

$$L_T = \frac{1}{B_T} \sum_{i=1}^{B_T} l^{(i)} \log \pi(\hat{x}_\varphi^{(i)})$$

wherein $1^{(i)} = -\log p_{s(i)}^{(i)}$ is the per-example CE loss. In this regard $I^{(i)}$ does not depend on $\psi$. The updated parameters the transmitter, such as the preamble generator, are based on the second probability and the indication of the sample of the respective second sequence that corresponds the particular symbol of the corresponding frame.

Following determination of the updated parameters of the transmitter 12, such as the preamble generator 50, the configuration apparatus 18, such as the processing circuitry 32, of this example embodiment is configured to determine whether the training process for the transmitter is completed, such as by having satisfied a predefined stopping criteria. See block 104 of FIG. 9. The predefined stopping criteria may be defined in various manners including, for example, the completion of a predefined number of iterations of the process depicted as the second phase of FIG. 9 or the variation in the amount by which the trainable parameters are modified from the prior iteration to the current iteration of the second phase being less than a predefined amount.

If the predefined stopping criteria is not satisfied, the first phase of the training process is repeated. Thus, the configuration apparatus 18 of this example embodiment includes means, such as the processing circuitry 32, the communication interface 36 or the like, for repeatedly receiving the second probability vector p and the indication s of the sample of the respective second sequence that corresponds to the particular symbol of the corresponding frame and means, such as the processing circuitry or the like, for determining one or more updated parameters of the transmitter 12, such as the preamble generator 50, in order the train the transmitter, such as the preamble generator.

However, once the second phase is determined to have been completed, the configuration apparatus 18, such as the processing circuitry 32, of this example embodiment is configured to determine whether the overall training process for both the transmitter 12 and the receiver 14 is completed, such as by having satisfied a predefined stopping criteria. See block 106 of FIG. 9. The predefined stopping criteria may be defined in various manners including, for example, the completion of a predefined number of iterations of the overall process. Once the stopping criterion for the overall training process is satisfied, the configuration apparatus, such as the processing circuitry, is configured to reconfigure the transmitter, such as the preamble generator 50 of the transmitter, and the receiver, such as the frame detector 56 of the receiver, by modifying the trainable parameters with the updated parameters determined in accordance with the training process of FIG. 9.

As described above, a method, apparatus, receiver and system are disclosed for providing timing synchronization during data transmission over a channel 16, such as a stochastic channel. In this regard, the method, apparatus and system are configured to concurrently train the end-to-end system 10 including both the transmitter 12 and the receiver 14 so as to provide for improved symbol timing synchronization. By providing for improved symbol timing synchronization, data may be transmitted via the channel more effectively with the data being interpreted, such as decoded, in a more accurate manner.

FIGS. 3 and 5-7 illustrate flowcharts depicting methods according to an example embodiment of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 24 of an apparatus employing an embodiment of the present invention and executed by a processor 22. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. For example, in some embodiments in which the channel 16 is subject to interference, the training of the end-to-end system 10 may also permit the system to be optimized while taking into account the interference, thereby reducing the otherwise deleterious impact of the interference. As another example, while the foregoing embodiment have employed a single transmitter 12, the channel of other embodiments is configured to support the concurrent transmissions from multiple transmitters and/or multiple sources of data with the training of the end-to-end system permitting the concurrent transmission to be optimized. As a further example, the configuration apparatus 18, method and computer program product are described above in conjunction with the training of parameters of the preamble generator 50 and the receiver 14, but, in other embodiments, may also provide for the training of parameters of the data generator 52 and/or the channel.

In yet another embodiment depicted in dashed lines in FIG. 5, the preamble generator 50 may be configured to provide and the frame detector 56 may be configured to receive the preamble $x_\psi$. By utilizing the preamble $x_\psi$ during the process of generating the probability vector p, the receiver 14, such as the frame detector, is configured to generate a more accurate probability vector 5.

Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A system comprising:
a transmitter configured to:
transmit, via a channel, a plurality of frames that are comprised of a plurality of symbols including a preamble and one or more data symbols; and
transmit, via the channel, a second plurality of frames that are comprised of a second plurality of symbols including a perturbed preamble and one or more second data symbols;
a receiver configured to:
receive a plurality of sequences of samples generated by the channel in response to the plurality of frames transmitted by the transmitter, wherein, for individual ones of the plurality of sequences of samples that are received, the receiver is configured to determine a probability vector assigning probabilities to the sample of a respective sequence that identify the probability that a respective sample corresponds to a particular symbol of the frame;
determine, for individual ones of a plurality of second sequences of samples generated by the channel in response to transmission of corresponding ones of the second plurality of frames, a second probability vector assigning probabilities to the samples of a respective second sequence that identify the probability that a respective sample corresponds to a particular symbol of the corresponding frame; and
receive an indication of the sample of the respective second sequence that corresponds to the particular symbol of the corresponding frame;
at least one processor configured, for each of the plurality of sequences of samples received by the receiver, to:
determine one or more updated parameters of a frame detector of the receiver, wherein the updated parameters of the frame detector of the receiver are based on the probability vector and an indication of the sample of the respective sequence that corresponds to the particular symbol of the corresponding frame; and
determine one or more updated parameters of a preamble generator of the transmitter that provides the preamble for transmission over the channel based on the second probability vector and the indication of the sample of the respective second sequence that corresponds to the particular symbol of the corresponding frame, wherein the transmitter and the receiver are reconfigured based upon the one or more updated parameters of the transmitter and the receiver, respectively.

2. A system according to claim 1, wherein the at least one processor is further configured to determine one or more updated parameters of the receiver by determining the one or more updated parameters of the receiver with an optimization function that uses a loss function that is based upon the probability vector and the indication of the sample of the respective sequence that corresponds to the particular symbol of the corresponding frame, and wherein the at least one processor is further configured to determine one or more updated parameters of the transmitter by determining the one or more updated parameters of the transmitter with an optimization function that uses a loss function that is based upon the second probability vector and the indication of the sample of the respective second sequence that corresponds to the particular symbol of the corresponding frame.

3. A system comprising:
a transmitter configured to transmit, via a channel, a plurality of frames that are comprised of a plurality of symbols including a preamble and one or more data symbols;
a receiver configured to receive a plurality of sequences of samples generated by the channel in response to the plurality of frames transmitted by the transmitter, wherein, for individual ones of the plurality of sequences of samples that are received, the receiver is configured to determine a probability vector assigning probabilities to the sample of a respective sequence that identify the probability that a respective sample corresponds to a particular symbol of the frame;
at least one processor configured, for each of the plurality of sequences of samples are received by the receiver, to:
determine one or more updated parameters of a frame detector of the receiver, wherein the updated parameters of the frame detector of the receiver are based on the probability vector and an indication of the sample of the respective sequence that corresponds to the particular symbol of the corresponding frame; and
determine one or more updated parameters of a preamble generator of the transmitter that provides the preamble for transmission over the channel based on the probability vector and the indication of the sample of the respective sequence that corresponds to the particular symbol of the corresponding frame, wherein the transmitter and the receiver are reconfigured based upon the one or more updated parameters of the transmitter and the receiver, respectively.

4. A system according to claim 3, wherein the at least one processor is configured to determine one or more updated parameters of the receiver and the transmitter by determining the one or more updated parameters of the receiver and the transmitter with an optimization function that uses a loss function that is based upon the probability vector and the indication of the sample of the respective sequence that corresponds to the particular symbol of the corresponding frame.

5. A system according to claim 1, wherein at least one of the transmitter or the receiver comprises a neural network having a plurality of trainable parameters that are updated by determinations of the at least one processor.

6. A system according to claim 1, wherein the receiver is further configured to receive the preamble from transmitter.

7. A system according to claim 1, wherein the receiver is also configured to receive interfering signals propagating along the channel from one or more sources or other external effects upon the channel.

8. A receiver comprising:
a communication interface configured to receive a plurality of sequences of samples generated by a channel in response to a plurality of frames transmitted by a transmitter and which are comprised of a plurality of symbols including a preamble and one or more data symbols and to receive a second plurality of sequences of samples generated by the channel in response to a second plurality of frames that are transmitted by the transmitter and are comprised of a second plurality of symbols including a perturbed preamble and one or more second data symbols; and
at least one processor configured, for individual sequences of the plurality of sequences of samples that are received, to determine a probability vector assigning probabilities to the samples of a respective sequence that identify the probability that a respective sample corresponds to a particular symbol of a corresponding frame and configured, for individual ones of a plurality of second sequences of samples generated by the channel in response to transmission of corresponding ones of the second plurality of frames, to determine a second probability vector assigning probabilities to the samples of a respective second sequence that identify the probability that a respective sample corresponds to a particular symbol of the corresponding frame, wherein the at least one processor is configured to implement a frame detector as a neural network having a plurality of trainable parameters in order to identify the sample of a respective sequence that corresponds to the particular symbol of the corresponding frame, wherein the parameters of the neural network implemented by the at least one processor are updated based on the probability vector and an indication of the sample of the respective sequence that corresponds to the particular symbol of the corresponding frame, and wherein the second probability vector is used for determining updated parameters of a preamble generator of the transmitter that provides the preamble for transmission over the channel.

9. A receiver according to claim 8, wherein the communication interface is further configured to receive the preamble from the transmitter.

10. A receiver according to claim 8, wherein the communication interface is also configured to receive interfering signals propagating along the channel from one or more sources or other external effects upon the channel.

11. An apparatus comprising: at least one processor; and at least one memory including computer program code, the at least one memory and the computer program code configured to, with the at least one processor, cause the apparatus at least to perform:

for individual ones of a plurality of sequences of samples generated by a channel in response to transmission of corresponding frames that are comprised of a plurality of symbols including a preamble and one or more data symbols, receive: (i) a probability vector assigning probabilities to the samples of a respective sequence that identify the probability that a respective sample corresponds to a particular symbol of the frame, and (ii) an indication of the sample of the respective sequence that corresponds to the particular symbol of the corresponding frame;

for individual ones of a plurality of second sequences of samples generated by the channel in response to transmission of corresponding frames that are comprised of a plurality of symbols including a perturbed preamble and one or more data symbols, receive: (i) a second probability vector assigning probabilities to the samples of a respective second sequence that identify the probability that a respective sample corresponds to a particular symbol of the corresponding frame, and (ii) an indication of the sample of the respective sequence that corresponds to the particular symbol of the corresponding frame;

determine one or more updated parameters of a frame detector of a receiver that receives the sequence of samples from the channel, wherein the updated parameters of the frame detector are based on the probability vector and the indication of the sample of the respective sequence that corresponds to the particular symbol of the corresponding frame; and determine one or more updated parameters of a preamble generator of a transmitter that provides the preamble for transmission over the channel based on the second probability vector and the indication of the sample of the respective second sequence that corresponds to the particular symbol of the corresponding frame.

12. An apparatus according to claim 11, wherein the at least one memory and the computer program code are further configured to, with the at least one processor, cause the apparatus to:

repeatedly receive the probability vector and the indication of the sample of the respective sequence that corresponds to the particular symbol of the corresponding frame and determine one or more updated parameters of the frame detector of the receiver in order to train the frame detector; and repeatedly receive the second probability vector and the indication of the sample of the respective second sequence that corresponds to the particular symbol of the corresponding frame and determine one or more updated parameters of the preamble generator of the transmitter in order to train the preamble generator.

13. An apparatus according to claim 11, wherein the at least one memory and the computer program code are further configured to, with the at least one processor, cause the apparatus to determine one or more updated parameters of the frame detector of the receiver by determining the one or more updated parameters of the frame detector with an optimization function that uses a loss function that is based upon the probability vector and the indication of the sample of the respective sequence that corresponds to the particular symbol of the corresponding frame, and wherein the at least one memory and the computer program code are configured to, with the at least one processor, cause the apparatus to determine one or more updated parameters of the preamble generator of the transmitter by determining the one or more updated parameters of the preamble generator with an optimization function that uses a loss function that is based upon the second probability vector and the indication of the sample of the respective second sequence that corresponds to the particular symbol of the corresponding frame.

14. An apparatus comprising:

At least one processor; and at least one memory including computer program code, the at least one memory and the computer program code configured to, with the at least one processor, cause the apparatus at least to perform:

for individual ones of a plurality of sequences of samples generated by a channel in response to transmission of corresponding frames that are comprised of a plurality of symbols including a preamble and one or more data symbols, receive: (i) a probability vector assigning probabilities to the samples of a respective sequence that identify the probability that a respective sample corresponds to a particular symbol of the frame, and (ii) an indication of the sample of the respective sequence that corresponds to the particular symbol of the corresponding frame;

determine one or more updated parameters of a frame detector of a receiver that receives the sequence of samples from the channel, wherein the updated parameters of the frame detector are based on the probability vector and the indication of the sample of the respective sequence that corresponds to the particular symbol of the corresponding frame; and determine one or more updated parameters of a preamble generator of a transmitter that provides the preamble for transmission over the channel based on the probability vector and the indication of the sample of the respective sequence that corresponds to the particular symbol of the corresponding frame.

15. An apparatus according to claim 14, wherein the at least one memory and the computer program code are further configured to, with the at least one processor, cause the apparatus to repeatedly receive the probability vector and the indication of the sample of the respective sequence that corresponds to the particular symbol of the corresponding frame and determining one or more updated parameters of the frame detector and of the preamble generator in order to train both the preamble generator and the frame detector.

16. An apparatus according to claim 14, wherein the at least one memory and the computer program code are configured to, with the at least one processor, cause the apparatus to determine one or more updated parameters of the frame detector and the preamble generator by determining the one or more updated parameters of the frame detector and the preamble generator with an optimization function that uses a loss function that is based upon the probability vector and the indication of the sample of the respective sequence that corresponds to the particular symbol of the corresponding frame.

17. A method comprising:
for individual ones of a plurality of sequences of samples generated by a channel in response to transmission of corresponding frames that are comprised of a plurality of symbols including a preamble and one or more data symbols, receiving: (i) a probability vector assigning probabilities to the samples of a respective sequence that identify the probability that a respective sample corresponds to a particular symbol of the frame, and (ii) an indication of the sample of the respective sequence that corresponds to the particular symbol of the corresponding frame;
for individual ones of a plurality of second sequences of samples generated by the channel in response to transmission of corresponding frames that are each comprised of a plurality of symbols including a perturbed preamble and one or more data symbols, receiving (i) a second probability vector assigning probabilities to the samples of a respective second sequence that identify the probability that a respective sample corresponds to a particular symbol of the corresponding frame, and (ii) an indication of the sample of the respective second sequence that corresponds to the particular symbol of the corresponding frame;
determining one or more updated parameters of a frame detector of a receiver that receives the sequence of samples from the channel, wherein the updated parameters of the frame detector are based on the probability vector and the indication of the sample of the respective sequence that corresponds to the particular symbol of the corresponding frame; and
determining one or more updated parameters of a preamble generator of a transmitter that provides the preamble for transmission over the channel based on the second probability vector and the indication of the sample of the respective second sequence that corresponds to the particular symbol of the corresponding frame.

18. A method according to claim 17, further comprising: repeatedly receiving the probability vector and the indication of the sample of the respective sequence that corresponds to the particular symbol of the corresponding frame and determining one or more updated parameters of the frame detector of the receiver in order to train the frame detector; and
repeatedly receiving the second probability vector and the indication of the sample of the respective second sequence that corresponds to the particular symbol of the corresponding frame and determining one or more updated parameters of the preamble generator of the transmitter in order to train the preamble generator.

19. A method according to claim 17 wherein determining one or more updated parameters of the frame detector of the receiver comprises determining the one or more updated parameters of the frame detector with an optimization function that uses a loss function that is based upon the probability vector and the indication of the sample of the respective sequence that corresponds to the particular symbol of the corresponding frame, and wherein determining one or more updated parameters of the preamble generator of the transmitter comprises determining the one or more updated parameters of the preamble generator with an optimization function that uses a loss function that is based upon the second probability vector and the indication of the sample of the respective second sequence that corresponds to the particular symbol of the corresponding frame.

20. A method comprising:
for individual ones of a plurality of sequences of samples generated by a channel in response to transmission of corresponding frames that are comprised of a plurality of symbols including a preamble and one or more data symbols, receiving: (i) a probability vector assigning probabilities to the samples of a respective sequence that identify the probability that a respective sample corresponds to a particular symbol of the frame, and (ii) an indication of the sample of the respective sequence that corresponds to the particular symbol of the corresponding frame;
determining one or more updated parameters of a frame detector of a receiver that receives the sequence of samples from the channel, wherein the updated parameters of the frame detector are based on the probability vector and the indication of the sample of the respective sequence that corresponds to the particular symbol of the corresponding frame; and
determining one or more updated parameters of a preamble generator of a transmitter that provides the preamble for transmission over the channel based on the probability vector and the indication of the sample of the respective sequence that corresponds to the particular symbol of the corresponding frame.

21. A method according to claim 20, further comprising repeatedly receiving the probability vector and the indication of the sample of the respective sequence that corresponds to the particular symbol of the corresponding frame and determining one or more updated parameters of the frame detector and of the preamble generator in order to train both the preamble generator and the frame detector.

22. A method according to claim 20, wherein determining one or more updated parameters of the frame detector and the preamble generator comprises determining the one or more updated parameters of the frame detector and the preamble generator with an optimization function that uses a loss function that is based upon the probability vector and the indication of the sample of the respective sequence that corresponds to the particular symbol of the corresponding frame.

* * * * *